(12) United States Patent
Durrant et al.

(10) Patent No.: US 7,243,837 B2
(45) Date of Patent: Jul. 17, 2007

(54) MEDIA CONVERTER RFID SECURITY TAG

(75) Inventors: Richard C. E. Durrant, Algonquin, IL (US); Mark Waldron, Poplar Grove, IL (US)

(73) Assignee: Stratos International, Inc., Chicago, IL (US)

( * ) Notice: Subject to any disclaimer, the term of this patent is extended or adjusted under 35 U.S.C. 154(b) by 11 days.

(21) Appl. No.: 11/225,724

(22) Filed: Sep. 13, 2005

(65) Prior Publication Data

US 2006/0006221 A1    Jan. 12, 2006

Related U.S. Application Data

(63) Continuation-in-part of application No. 10/816,749, filed on Apr. 2, 2004.

(51) Int. Cl.
*G06F 17/00* (2006.01)

(52) U.S. Cl. .................. 235/375; 235/492; 340/687; 340/10.1

(58) Field of Classification Search ............... 235/492, 235/375; 385/53, 60, 78; 382/100; 340/687, 340/505, 572.1, 572.4, 10.1; 356/73.1
See application file for complete search history.

(56) References Cited

U.S. PATENT DOCUMENTS

| | | | |
|---|---|---|---|
| 5,206,626 A | 4/1993 | Minasy et al. | 340/572 |
| 5,233,674 A | 8/1993 | Vladic | 385/56 |
| 5,247,595 A | 9/1993 | Foldi | 385/78 |
| 5,448,110 A | 9/1995 | Tuttle et al. | 257/723 |
| 5,473,715 A | 12/1995 | Schofield et al. | 385/53 |
| 5,481,634 A | 1/1996 | Anderson et al. | 385/76 |
| 5,636,020 A | 6/1997 | Csipkes et al. | 356/345 |
| 5,821,510 A | 10/1998 | Cohen et al. | 235/375 |
| 5,910,776 A * | 6/1999 | Black | 340/10.1 |
| 6,118,379 A | 9/2000 | Kodukula et al. | 340/572.8 |
| 6,147,655 A | 11/2000 | Roesner | 343/741 |
| 6,234,683 B1 | 5/2001 | Waldron et al. | 385/78 |
| 6,305,848 B1 * | 10/2001 | Gregory | 385/53 |
| 6,350,063 B1 | 2/2002 | Gilliland et al. | 385/88 |
| 6,424,263 B1 | 7/2002 | Lee et al. | 340/572.7 |
| 6,429,831 B2 | 8/2002 | Babb | 343/895 |
| 6,445,297 B1 | 9/2002 | Nicholson | 340/572.7 |
| 6,451,154 B1 | 9/2002 | Grabau et al. | 156/300 |
| 6,677,917 B2 | 1/2004 | Van Heerden et al. | 343/897 |
| 6,784,802 B1 | 8/2004 | Stanescu | 340/687 |
| 6,808,116 B1 | 10/2004 | Eslambolchi et al. | 235/492 |
| 6,913,402 B2 | 7/2005 | Bohlin et al. | 385/93 |
| 7,027,704 B2 | 4/2006 | Frohlich et al. | 385/135 |
| 2004/0008114 A1 | 1/2004 | Sawyer | 340/572.1 |
| 2004/0008120 A1 | 1/2004 | Duncan et al. | 340/685 |
| 2004/0008123 A1 | 1/2004 | Carrender et al. | 340/825.49 |
| 2004/0010449 A1 | 1/2004 | Berardi et al. | 705/16 |
| 2004/0105325 A1 | 6/2004 | Sago et al. | 365/200 |
| 2004/0117515 A1 | 6/2004 | Sago et al. | 710/1 |
| 2004/0120657 A1 | 6/2004 | Sago et al. | 385/88 |
| 2004/0156601 A1 | 8/2004 | Koyasu et al. | 385/100 |

* cited by examiner

*Primary Examiner*—Daniel A. Hess
(74) *Attorney, Agent, or Firm*—Karl D. Kovach

(57) ABSTRACT

The device includes a fiber optic cable, a transponder, a media converter, an antenna, and a transceiver. The transponder is attached to the fiber optic cable. The media converter is mountable to a bulkhead. The antenna is attached to the media converter. The transceiver is electrically connected to the antenna so as to form a reader which is capable of activating and interrogating the transponder when the transponder is sufficiently close to the antenna.

4 Claims, 5 Drawing Sheets

MEDIA CONVERTER RFID SECURITY TAG

This application is a continuation-in-part of U.S. Ser. No. 10/816,749, filed Apr. 2, 2004. The aforementioned parent application is hereby incorporated herein by reference.

BACKGROUND OF THE INVENTION

1. Field of the Invention

The present invention pertains to radio frequency identification devices. The invention more particularly concerns the radio frequency identification of a connector by a media converter.

2. Discussion of the Background

Radio frequency identification devices (RFID) are known in the art. Typically, radio frequency identification systems incorporate an antenna or coil, a transceiver (with decoder), and a transponder (RF tag). Often times the antenna and the transceiver are packaged together so as to form a reader or interrogator. The transponder includes a transponder antenna and an integrated circuit chip attached to the transponder antenna. The antenna or coil emits a radio wave which induces an electrical current in the antenna of the transponder. The electrical current then activates the integrated circuit chip of the transponder. The integrated circuit chip can then transmit information through the antenna of the transponder via radio waves back to the antenna or coil. Information can be stored on the integrated circuit as either read only memory or read/write memory.

Radio frequency identification devices can be either active or passive. An active system includes a transponder which contains its own power source. In contrast, in a passive system the transponder obtains the energy from the radio waves emanating from the antenna or coil so as to enable the transponder to operate and transmit information. A transponder operating in accordance with the active system is able to transmit information to the antenna or coil over a greater distance than is a transponder operating in accordance with the passive system. However, the transponder operating in accordance with the active system is larger than the transponder operating in accordance with the passive system. Furthermore, typically, transponders operating in accordance with the passive system contain integrated circuit chips that have read only memory. Examples of radio frequency identification components are presented in U.S. Pat. Nos. 5,206,626; 5,448,110; 6,118,379; 6,147,655; 6,424,263; 6,429,831; 6,445,297; 6,451,154; and 6,677,917. U.S. Pat. Nos. 5,206,626; 5,448,110; 6,118,379; 6,147,655; 6,424,263; 6,429,831; 6,445,297; 6,451,154; and 6,677,917 are hereby incorporated herein by reference.

Connectors, and media converters are also known in the art. Known connectors include fiber optic connectors and electrically conductive connectors. An electrically conductive connector can be attached to electrically conductive cable such as copper based cable, or the electrical conductive connector can be integrated into a device such as an optoelectronic device. U.S. Pat. No. 6,350,063 discloses electrical connectors and cables, and an optoelectronic device.

An optical connector can be attached to an optical fiber or optical fibers, or it can be part of an optoelectronic device or media converter. U.S. Pat. Nos. 5,233,674, and 5,481,634 disclose a fiber optic cable having a fiber optic connector where the fiber optic cable contains a single optical fiber. U.S. Pat. No. 6,234,683 discloses a fiber optic connector that contains more than one optical fiber. U.S. Pat. No. 5,247,595 discloses an expanded beam type of optical connector.

A media converter, also known as an optoelectronic transceiver or optoelectronic device, is disclosed in U.S. Pat. No. 6,913,402. The media converter disclosed in U.S. Pat. No. 6,913,402 is mountable to a bulkhead. In order to avoid confusion with the transceiver described above in association with the antenna, the optoelectronic transceiver described in this paragraph and through-out the rest of this document will be identified as a media converter. A media converter changes an electrical signal into an optical signal, and it also changes an optical signal into an electrical signal. U.S. Pat. Nos. 5,233,674; 5,247,595; 5,481,634; 6,234,683; 6,350,063; and 6,913,402 are hereby incorporated herein by reference.

Experience has shown that a fiber optic cable can be inadvertently detached from the media converter, and then the fiber optic cable is laid down adjacent to other fiber optic cables. The other terminal ends of the other fiber optic cables are connected to various other optoelectronic devices or media converters. When it is desired to reconnect the correct fiber optic cable to the media converter, the worker, typically, will attach many of the incorrect fiber optic cables to the media converter before the worker finally re-attached the correct fiber optic cable to the media converter. Such use of manpower is unproductive.

In another scenario the media converter can be attached to a bulkhead of a secure data communication center. If the fiber optic cable is detached from the media converter as part of an espionage activity, then the person taking part in the espionage activity can attach their fiber optic cable to the media converter. In this scenario, the other terminal end of the fiber optic cable used in the espionage activity is connected to a media converter controlled by the persons engaged in the espionage. The people involved in the espionage can then try to gain access to the secure data communication center and to all of the data, information, and communications that are stored or pass through the secure data communication center. Such espionage is not desirable.

SUMMARY OF THE INVENTION

It is an object of the invention to provide a device which facilitates the identification of a specific connector or cable relative to a specific media converter.

It is another object of the invention to provide secure communications via a connector and a media converter.

In one form of the invention the device includes a cable, a transponder, a media converter, an antenna, and a transceiver. The transponder is attached to the cable. The antenna is attached to the media converter. The transceiver is electrically connected to the antenna so as to form a reader which is capable of activating and interrogating the transponder when the transponder is sufficiently close to the antenna. The media converter is mountable to a bulkhead. In operation, when the transponder is placed close enough to the antenna, the transceiver is able to activate the transponder thus enabling the transceiver to read the information deposited with the transponder.

In another form of the invention, the device includes a fiber optic cable, a transponder, only one media converter, an antenna, and a transceiver. The transponder is attached to the fiber optic cable. The antenna is attached to the only one media converter. The only one media converter is mountable to a bulkhead. The transceiver is electrically connected to the antenna so as to form a reader or interrogator which is capable of activating and interrogating the transponder when the transponder is sufficiently close to the antenna.

In still yet another form of the invention, the device includes a fiber optic cable, a transponder, only one media converter, an antenna, and a transceiver. The fiber optic cable includes a fiber optic connector. The transponder is attached to the fiber optic connector. The transponder includes a unique identifying information about the fiber optic cable. The only one media converter is mountable to a bulkhead. The only one media converter is preset to accept only a specific unique identifying information. The antenna is attached to the only one media converter. The transceiver is electrically connected to the antenna so as to form a reader or interrogator which is capable of activating and interrogating the transponder when the transponder is sufficiently close to the antenna. When the fiber optic connector is mounted to the only one media converter, the reader reads the unique identifying information from the transponder attached to the fiber optic connector, if the unique identifying information from the transponder attached to the fiber optic connector is not the same as the specific unique identifying information preset with the only one media converter then the only one media converter will not accept any other information from the fiber optic cable attached to the fiber optic connector so as to secure a network. However, if the unique identifying information from the transponder attached to the fiber optic connector is the same as the specific unique identifying information preset with the only one media converter then the only one media converter will be activated and the only one media converter will begin to accept and transmit other information with the fiber optic cable attached to the fiber optic connector.

Thus, the invention achieves the objectives set forth above. The invention provides a device which is able to determine the association between a specific fiber optic cable and a specific media converter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
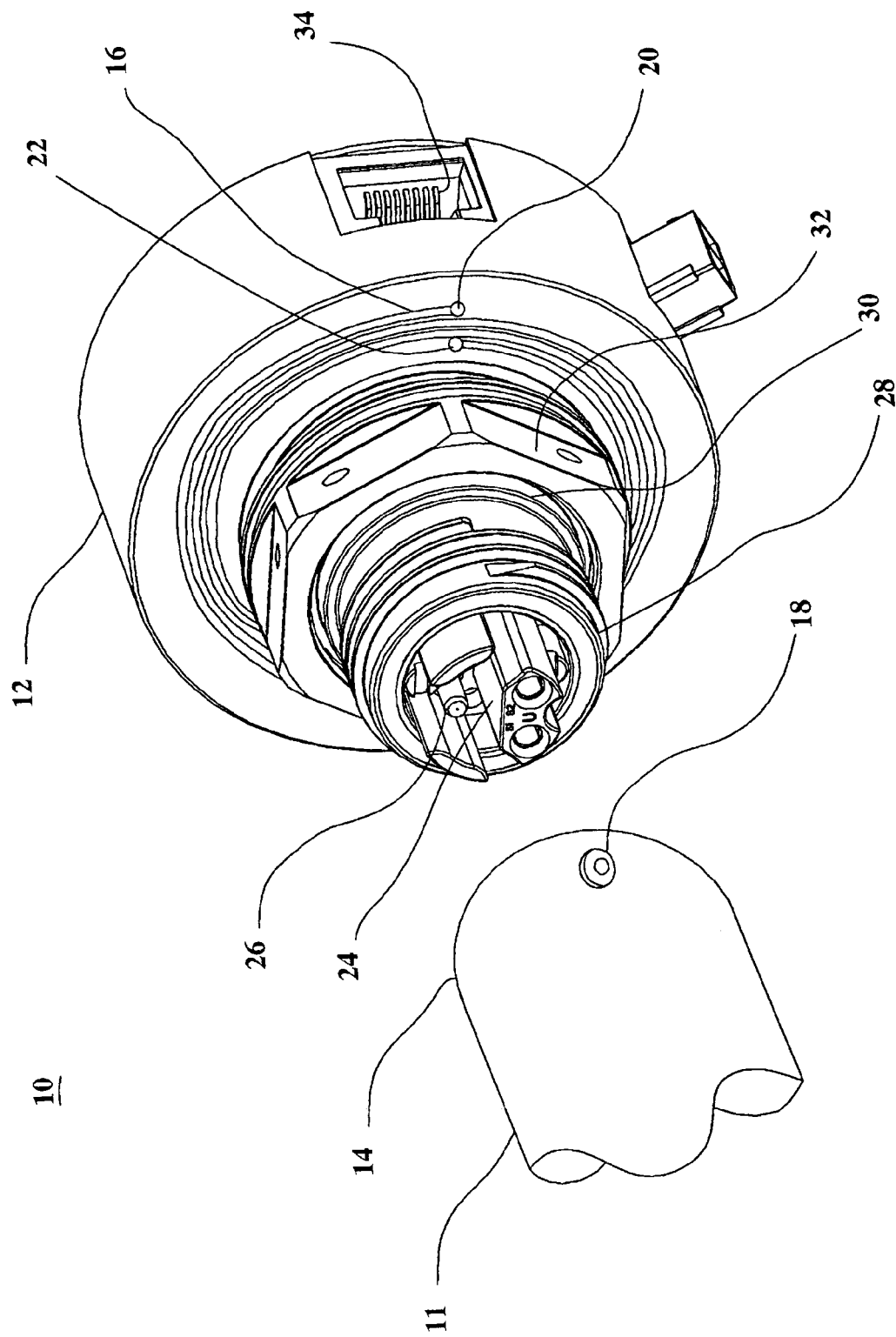
FIG. 1 is a perspective view of a combination of a fiber optic cable and a media converter.

Referring now to the drawings, wherein like reference numerals designate identical or corresponding parts throughout the several views, and more particularly to FIGS. 1-6 thereof, embodiments of the present invention are displayed therein.

FIG. 1 is a perspective view of a portion of a fiber optic cable 11, and a media converter 12. The fiber optic cable 11 includes a fiber optic connector 14. Also attached to, or mounted on or in, the fiber optic connector 14 is a transponder 18. The transponder 18 can be affixed to the fiber optic connector 14 with an adhesive material or a clip (not shown). The clip physically squeezes or clamps the transponder 18 to the fiber optic connector 14. Alternatively, the transponder 18 can be insert molded into the body of the fiber optic connector 14. Furthermore, the transponder 18 can be attached to fiber optic connectors which are already in-service.

The media converter 12 is of a type known as bulkhead mountable. The media converter 12 includes an optical connector portion 24, which is shown to include a ferrule 26. The optical connector portion 24 of the media converter is compatible with the industrial standard known as TFOCA-II, where TFOCA-II is a federally registered trademark owned by Fiber Systems International, however, any other standard can be conformed to such as HMA, or uniquely designed shapes can be employed. The fiber optic connector 14 of the fiber optic cable 11 has an optical connector portion which is complementary to the fiber optic connector portion 24 of the media converter 12. The media converter also includes a first threaded portion 28 by which the fiber optic connector 14 is secured to the media converter 12. The media converter 12 also includes a coil or antenna 16, and an electrical connector 34. Leads 20, 22 are the attachment points where, the antenna 16 enters the body of the media converter 12. Since this particular media converter is bulkhead mountable, the media converter 12 includes a second threaded portion 30 onto which is secured a panel nut 32. When the media converter 12 is mounted to a bulkhead, the bulkhead is trapped between the panel nut 32 and the body of the media converter 12.

The antenna 16 is shown to circumscribe the optical connector portion 24 of the media converter 12. The antenna 16 is made of a suitable electrically conductive material such as copper. The antenna 16 is adhered or attached to the media converter 12 by way of an adhesive, or the antenna 16 can first be mounted on a substrate and then the substrate is attached to the media converter 12. Typically, the antenna 16 is attached to the substrate with an adhesive material. The substrate is typically made of non-conductive or insulative materials such as mylar or other suitable polymer materials.

In practice, for example, a fiber optic connector 14 is threaded onto the media converter 12. Once installed, the antenna 16 circumscribes a portion of the fiber optic connector 14, but not in the plane of the transponder 18 since the panel nut 32 is positioned between the fiber optic connector 14 and the antenna 16. The transponder 18 is close enough to the antenna 16 so that the radio waves, or electromagnetic power 104, emanating from antenna 16 induces an electrical current in the transponder antenna 72 (see FIG. 2) of the transponder 18. The energy and frequency of the electrical signal running though the antenna 16 is provided by a transceiver 102 (see FIG. 2) which is electrically connected to the antenna 16. The combination of an antenna and a transceiver is known as a reader or interrogator. The transceiver 102 can be mounted inside the body of the media converter 12, or it can be mounted elsewhere, while the electrical connection between the antenna 16 and the transceiver 102 can be made through the electrical connector 34.

Figure 2:
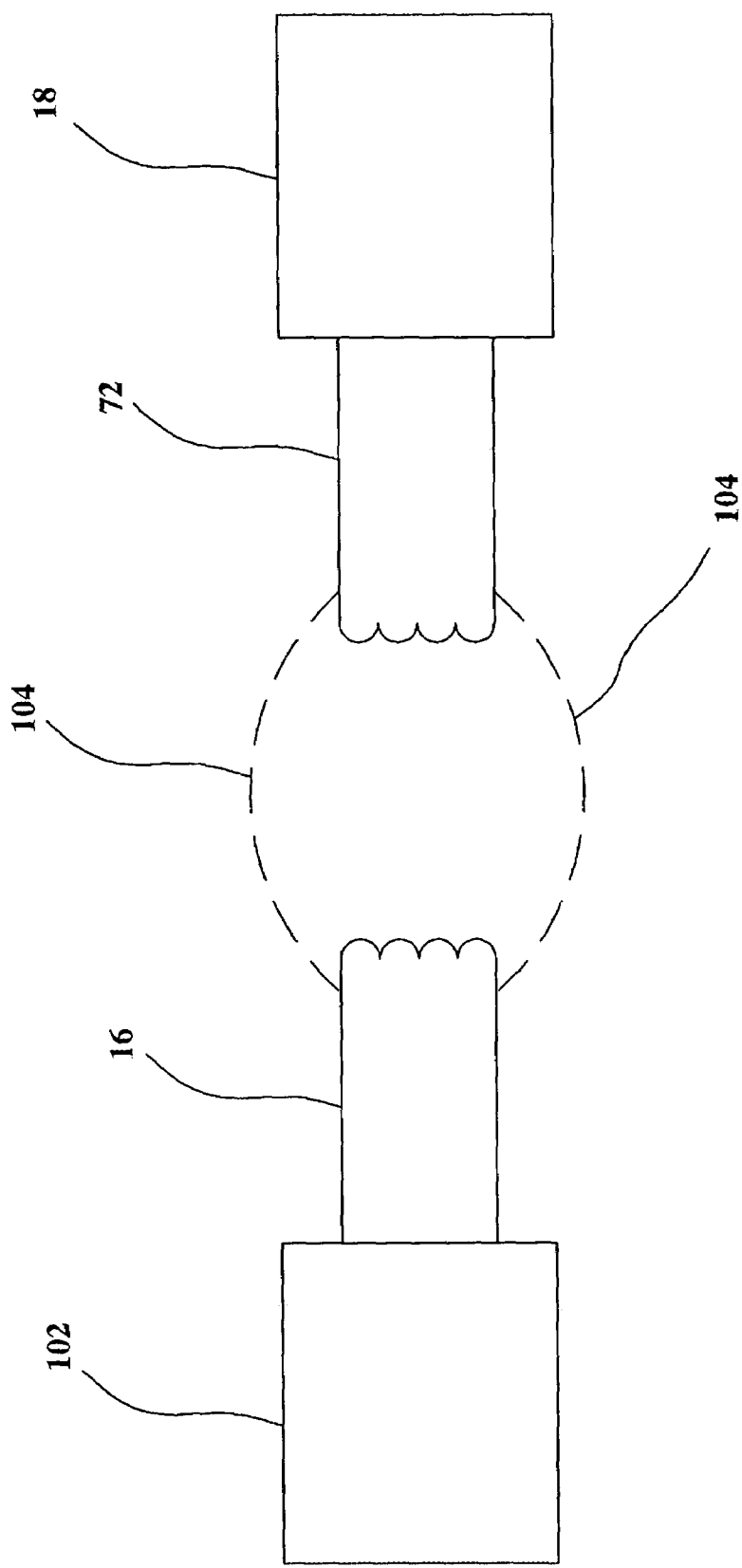
FIG. 2 is an electrical schematic of the electromagnetic interaction between a transponder and a reader or interrogator.

FIG. 2 is an electrical schematic of the electromagnetic interaction between the transponder 18 and the reader or interrogator (16, 102). Once the transponder 18 is energized by the power from the transceiver 102, the transponder sends information, which was previously stored on its integrated circuit chip, to the transceiver 102 via radio waves. The radio waves leave the transponder antenna 72 and are received by the antenna or coil 16. The induced electrical signal is then carried to the transceiver 102 for storage or manipulation of the data supplied by the transponder 18.

An example of information which can be deposited, stored, and retrieved in the transponder 18 include unique identifying information. The unique identifying information can be coded. Specifically, the unique identifying information can consist of alphabetic letters, numerals, or a combination of both.

The media converter 12 is preset to accept only one or one type of unique identifying information from the transponder of a fiber optic cable. Thus, when the fiber optic connector 14 is mounted to the media converter 12, the reader (16, 102) reads the unique identifying information off of the transponder 18. If the unique identifying information is not the same as the unique identifying information referenced by the media converter 12, then the media converter 12 will not accept information from the fiber optic cable 11, and likewise, the media converter 12 will not transmit any information to the fiber optic cable 11. However, if the unique identifying information of the fiber optic connector 14 does match the unique identifying information referenced by the media converter, then the media converter 12 will be activated and the media converter 12 will begin to accept and transmit information with the fiber optic cable 11. Therefore, if someone tries to connect an unauthorized fiber optic cable to the media converter 12, the media converter will not be activated, thus securing the network.

Additionally, the network associated with the media converter 12 can log each instance an authorized fiber optic cable 11 is connected to the media converter 12. Such information facilitates maintenance of the system. As an example, inspections of the ferrule 26 may be mandated by the manufacturer after the three thousand mountings of the media converter 12 by the fiber optic cable 11. Manual logging of such data is eliminated and the associated errors are eliminated.

Figure 3:
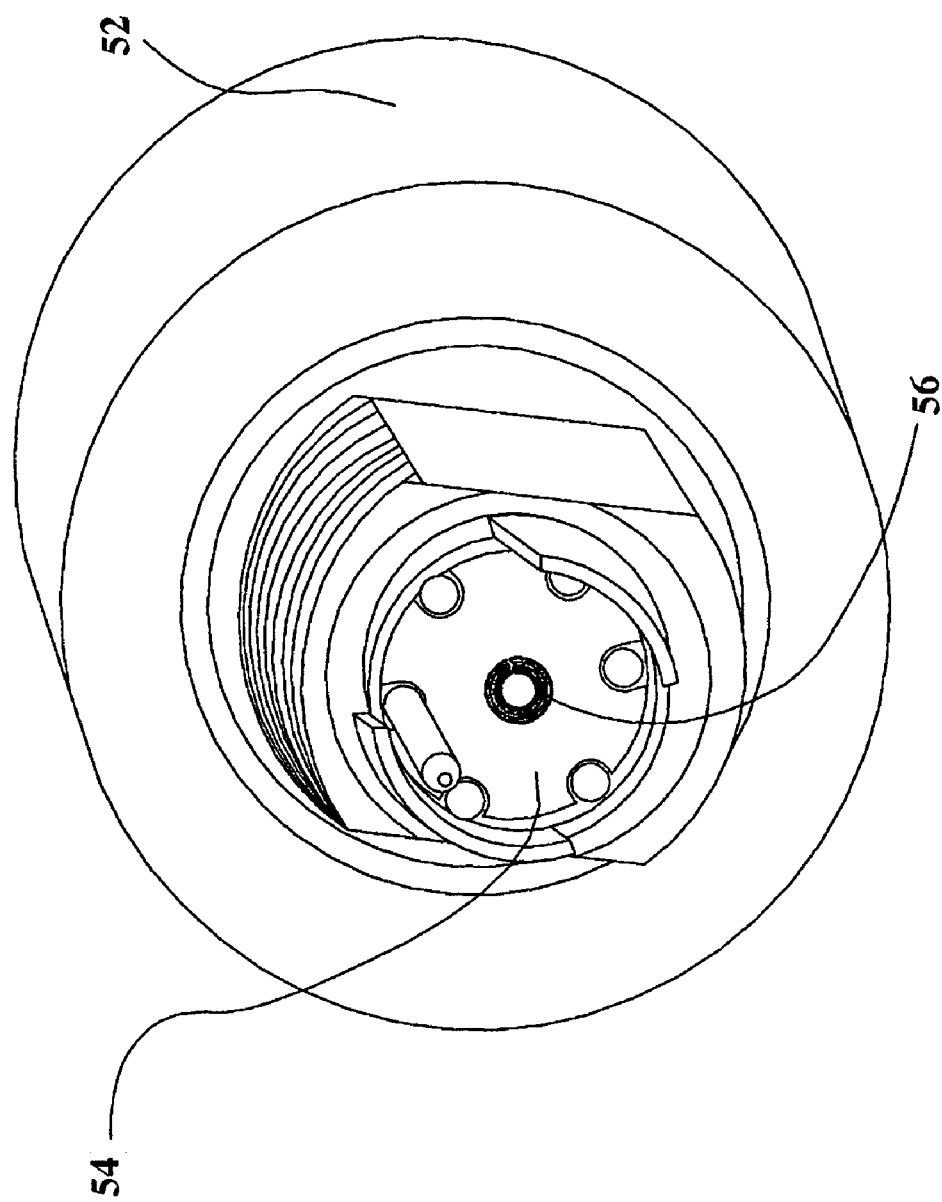
FIG. 3 is a perspective view of another version of the media converter.
Figure 4:
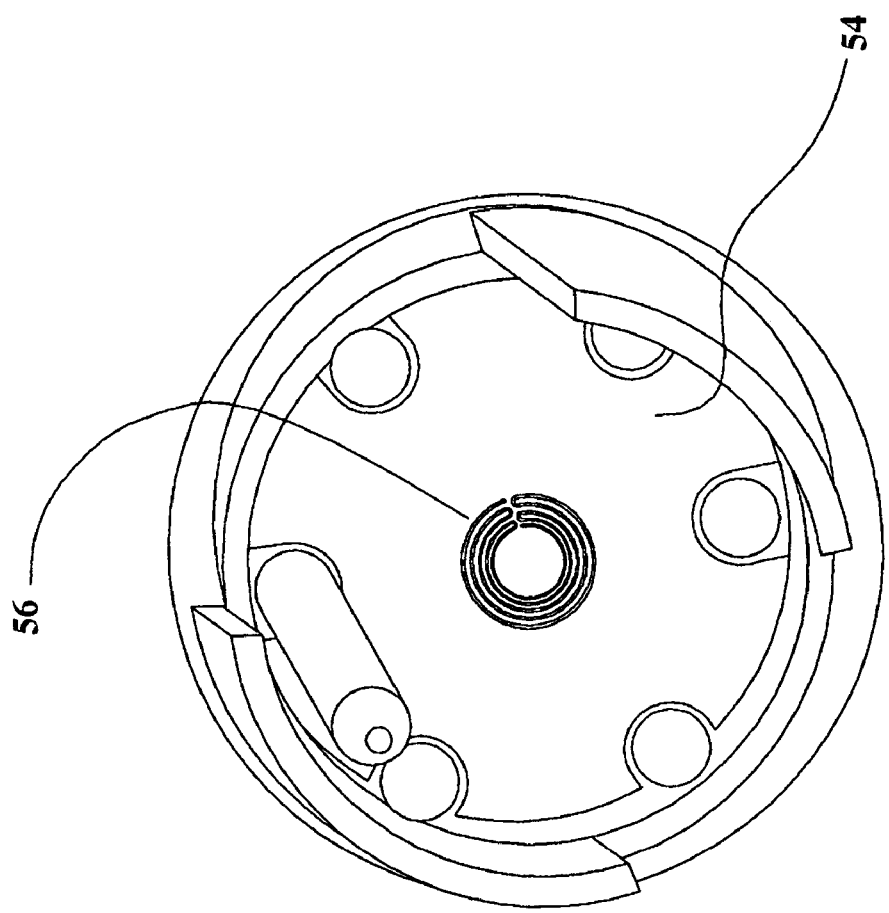
FIG. 4 is a partial, expanded perspective view of the media converter of FIG. 3.

A second embodiment of the invention is disclosed in FIGS. 3, 4, 5, and 6. FIG. 3 is a perspective view of another media converter 52, which is also bulkhead mountable. The media converter 52 has an optical connector portion 54. On the optical connector portion 54 is mounted an antenna 56. The antenna 56 of this embodiment works the same way as the antenna 16 of the first embodiment. FIG. 4 is a partial, expanded view of the optical connector portion 54 of the media converter 12 which shows in more detail the location and shape of the antenna 56. As compared to the first embodiment, the optical connector portion 54 of the media converter 52 of the second embodiment conforms to a different industrial standard.

Figure 5:
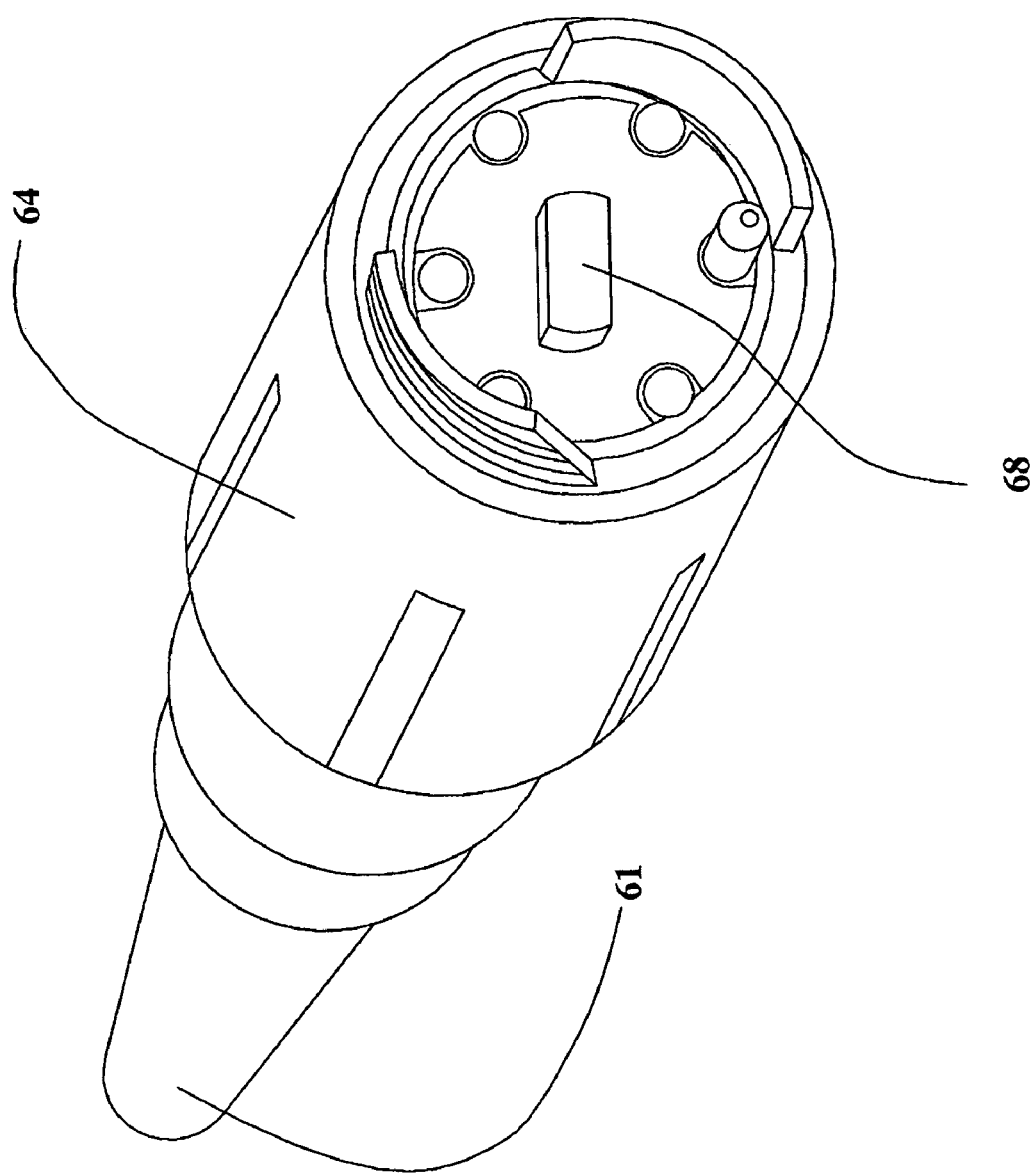
FIG. 5 is a perspective view of another version of the fiber optic cable.

FIG. 5 is a perspective view of another fiber optic cable 61 having a fiber optic connector 64, and a transponder 68. Transponder 68 of the second embodiment works the same way as the transponder 18 of the first embodiment. The optical connector portion 54 is designed so as to be complementary with the design of the fiber optic connector 64. The positioning of the antenna 56 and transponder 68 in this embodiment helps to keep the antenna 56 and transponder 68 from being easily damaged since the antenna 56 and transponder 68 are mounted away from large exterior surfaces of the media converter 52, and the fiber optic cable 61, respectively. Also, this embodiment places the transponder 68 in close proximity to the antenna 56 when the fiber optic cable 61 is mounted on the media converter 52.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
   a fiber optic cable having a fiber optic connector;
   a transponder attached to the fiber optic connector, the transponder including a unique identifying information about the fiber optic cable;
   only one media converter, the only one media converter mountable to a bulkhead, and the only one media converter preset to accept only a specific unique identifying information;
   an antenna attached to the only one media converter; and
   a transceiver electrically connected to the antenna so as to form a reader which is capable of activating and interrogating the transponder when the transponder is sufficiently close to the antenna, and wherein,
   when the fiber optic connector is mounted to the only one media converter, the reader reads the unique identifying information from the transponder attached to the fiber optic connector, if the unique identifying information from the transponder attached to the fiber optic connector is not the same as the specific unique identifying information preset with the only one media converter then the only one media converter will not accept any other information from the fiber optic cable attached to the fiber optic connector so as to secure a network, and wherein,
   when the fiber optic connector is mounted to the only one media converter, the reader reads the unique identifying information from the transponder attached to the fiber optic connector, if the unique identifying information from the transponder attached to the fiber optic connector is the same as the specific unique identifying information preset with the only one media converter then the only one media converter will be activated and the only one media converter will begin to accept and transmit other information with the fiber optic cable attached to the fiber optic connector.

2. A device according to claim 1 wherein the transponder includes a transponder antenna and an integrated circuit chip attached to the transponder antenna.

3. A device according to claim 2 wherein the only one media converter includes an optical connector portion, and wherein the antenna circumscribes the optical connector portion of the only one media converter.

4. A device according to claim 2 wherein the only one media converter includes an optical connector portion, and wherein the antenna is attached to the optical connector portion of the only one media converter.

* * * * *